UNITED STATES PATENT OFFICE.

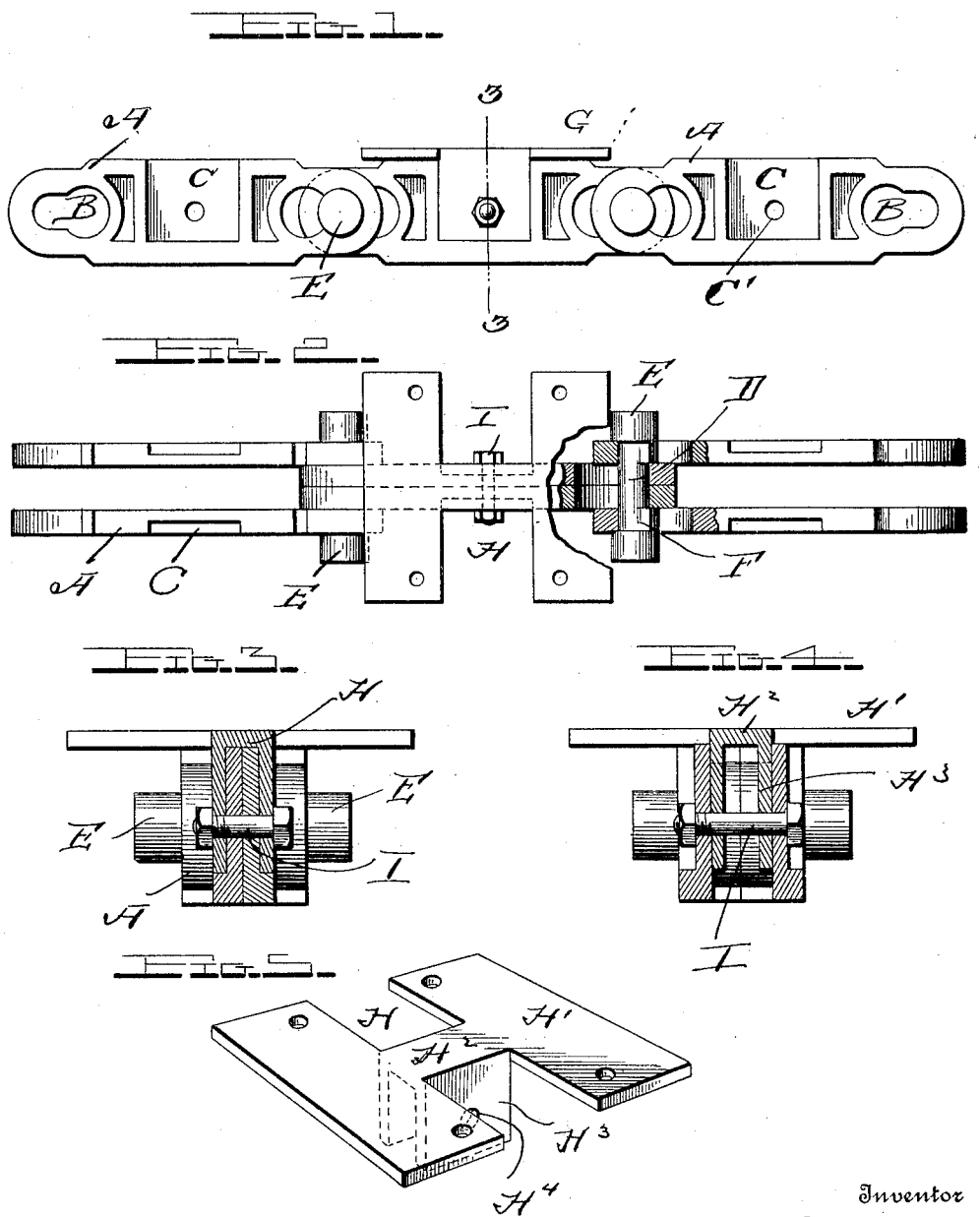

WILLIAM P. COLDREN, OF LEBANON, PENNSYLVANIA.

CHAIN AND BUCKET CONNECTION.

1,111,823.     Specification of Letters Patent.     Patented Sept. 29, 1914.

Application filed June 27, 1913. Serial No. 776,153.

*To all whom it may concern:*

Be it known that I, WILLIAM P. COLDREN, a citizen of the United States, residing at Lebanon, in the county of Lebanon and State of Pennsylvania, have invented a new and useful Improvement in Chain and Bucket Connections, of which the following is a specification.

This invention relates generally to conveyers and more particularly to the novel construction of chain links constituting a part of said conveyer and the invention relates also to the novel form of connecting means for connecting the bucket or conveyer proper to the links of the chain.

The object of my invention is to provide a novel form of link and a novel form of bucket or conveyer connection, said links and connector being of such construction that the links can be used either as inside links or outside links, and a still further object of the invention is to so construct and arrange these co-acting elements that a firm connection will be established independent of the connecting bolt, thereby relieving the said bolt of all strain and rendering the chain as a whole more durable and efficient.

With these objects in view, my invention consists of the novel features of construction, combination and arrangement all of which will be fully described hereinafter, and pointed out in the claims.

In the drawings forming a part of this specification: Figure 1 is a side view. Fig. 2 is a top view. Figs. 3 and 4 are transverse sections, and Fig. 5 is a detail perspective view.

In carrying out my invention I employ a link A having key-hole shaped pin openings B adjacent the ends, the contracted portions of said openings extending toward the adjacent end as most clearly shown. Each link is constructed with a rectangular shaped recess C in one face thereof, substantially at the central portion of the link, said recess extending from one edge of the link to nearly the opposite edge and at the central portion thereof the link is provided with an aperture C' which may or may not be provided with a countersink upon the flat face of the link. These links so constructed are adapted for use as either an inside link or an outside link as most clearly shown in the drawings and for the purpose of pivotally connecting these links together, I employ a pin D having heads E somewhat larger than the pin proper, the heads being of a size to pass through the large portions of the openings B and the pin of a size to fit the small portion of said opening. The heads are of such size and are so positioned that when two outside and two inside links are connected together the heads will securely hold them properly spaced, it being understood that the links are moved apart in opposite longitudinal directions so as to bring the pin into engagement with the contracted portions of the openings and in order to hold the pin in fixed relation to the outside rings I provide parallel faced lugs F upon the pin adjacent to and integral with the heads, said lugs occupying the contracted portion of the opening and holding the pin against rotation with the link which it engages. With the parallel faced lugs arranged adjacent the heads, the inner links are free to turn and if it should be desired to lock the inner links and permit the outer links to turn the parallel faced lugs will be arranged at the center of the pin in the form of one lug of double length.

It will thus be seen that I provide a strong, durable and quick and easy method of connecting the links together.

In order to provide a strong, durable and convenient connection between the bucket or conveyer G as shown in dotted lines and the links of the chain I provide a connector H comprising two flat plates or wings H' apertured as shown for the attachment of the bucket and these two flat plates H' are united by means of a connecting portion H² from which extend the parallel ears H³ apertured as shown at H⁴, said parallel apertured ears being of a size and shape to fit the recesses of the links when said links are arranged with their flat faces together and their recessed faces opposed, the ears straddling the central portions of said links and seating firmly in the recesses provide a strong and durable connection and consequently the bolts I are only necessary to hold these parts in their proper relative positions and the greater portion if not all of the strain is removed from the bolt.

When the links are employed as inside links as shown in Figs. 2 and 3, the ears of the connector straddle these links but when the links are arranged as outside links the ears of the connection contact with the flat faces of said outside links and bear firmly thereagainst, the ears of the connector being of such size and shape and so spaced apart that their outer faces are in true alinement with the outer faces of the two inside links and therefore contact properly with the inner faces of the two inside links. The connector will thus be held firmly between the outside links, the bolt being passed through the links and ears of connector, the same as heretofore, except that where when the connector is attached to the inside links a short bolt is employed whereas when connected to the outside links a longer bolt is employed.

It will thus be seen that I provide not only a novel form of link but also a novel form of connector to be used with said link for the purpose of connecting the bucket or conveyer proper to the links of the chain.

What I claim is:—

1. The combination with a chain composed of series of similar links, each link having an apertured recessed portion intermediate its ends, of a connector comprising a plate portion adapted to extend transversely across a pair of opposed links, a connecting portion and parallel apertured ears extending from said connecting portion, said ears being adapted to contact with the apertured portions of pair of opposed links, and a bolt passing through said apertured links and ears as set forth.

2. The combination, with a chain composed of a plurality of similar links, each link being apertured and recessed intermediate its ends, of connector plates adapted to rest transversely across a pair of opposed links, said plates being united by an integral web, and apertured ears arranged at right angles to the said web and plates, said ears being parallel, spaced apart, and adapted to contact with the apertured portions of a pair of opposed links, and a bolt passing through said links and ears.

3. The combination, with a pair of opposed links each link being apertured and recessed intermediate its ends, of a connector comprising a plate portion adapted to extend transversely across a pair of links, and a pair of parallel apertured and spaced ears, said ears being of a size and shape and so spaced as to engage the recesses of the opposed links, and a bolt passing through said apertured ears and links as set forth.

WILLIAM P. COLDREN.

Witnesses:
G. H. BENDER,
F. J. BURKEY.